United States Patent
Ren et al.

(10) Patent No.: US 9,416,035 B2
(45) Date of Patent: Aug. 16, 2016

(54) DEVICE AND METHOD FOR SEWAGE TREATMENT USING CONSTANT MAGNETIC FIELD

(71) Applicant: Nanjing University, Nanjing (CN)

(72) Inventors: Hongqiang Ren, Nanjing (CN); Chuan Niu, Nanjing (CN); Jinju Geng, Nanjing (CN); Ke Xu, Nanjing (CN)

(73) Assignee: Nanjing University, Nanjing (CN)

( * ) Notice: Subject to any disclaimer, the term of this patent is extended or adjusted under 35 U.S.C. 154(b) by 233 days.

(21) Appl. No.: 13/968,421

(22) Filed: Aug. 15, 2013

(65) Prior Publication Data

US 2014/0138309 A1    May 22, 2014

(30) Foreign Application Priority Data

Nov. 22, 2012 (CN) .......................... 2012 1 0475425

(51) Int. Cl.
*C02F 1/48* (2006.01)
*C02F 3/12* (2006.01)
*C02F 3/20* (2006.01)

(52) U.S. Cl.
CPC . *C02F 3/12* (2013.01); *C02F 1/482* (2013.01); *C02F 3/121* (2013.01); *C02F 3/1284* (2013.01); *C02F 3/201* (2013.01); *C02F 2209/08* (2013.01); *Y02W 10/15* (2015.05)

(58) Field of Classification Search
CPC ........ C02F 1/488; C02F 2201/48; C02F 1/48; B03C 1/0332; B03C 1/12; B01D 21/0009; H01F 27/365
USPC ................... 210/695, 222; 204/557; 209/734
See application file for complete search history.

(56) References Cited

U.S. PATENT DOCUMENTS

| | | | | |
|---|---|---|---|---|
| 4,054,513 A | * | 10/1977 | Windle | .......................... 209/214 |
| 5,348,050 A | * | 9/1994 | Ashton | .......................... 137/827 |
| 2008/0073268 A1 | * | 3/2008 | Cort | .............................. 210/609 |
| 2008/0182309 A1 | * | 7/2008 | Vlad | ............................. 435/161 |
| 2009/0127204 A1 | * | 5/2009 | Meier | ........................... 210/695 |

FOREIGN PATENT DOCUMENTS

CN    101423272 B  * 11/2010

OTHER PUBLICATIONS

English Machine Translation CN101423272, Duan et al, Nov. 10, 2010, pp. 1-4.*
Hong et al, "Acclimating PHA storage capacity of activated sludge with static magnetic fields" Enzyme and Microbial Technology 46 (2010) pp. 594-597.*

* cited by examiner

*Primary Examiner* — Nam Nguyen
*Assistant Examiner* — Claire Norris
(74) *Attorney, Agent, or Firm* — Matthias Scholl, PC; Matthias Scholl

(57) ABSTRACT

A device for sewage treatment, including: a reactor and a magnetic field generator. The reactor includes a stirrer, an aerator, an activated sludge zone, an upper end including a water inlet, a side wall including a water outlet, and a bottom including a sludge outlet. The magnetic field includes magnets and iron plates. The activated sludge zone is disposed inside the reactor. The stirrer and the aerator are disposed within the activated sludge zone. The aerator is arranged beneath the stirrer. The magnetic field generator is disposed outside the reactor. The magnets and the iron plates are symmetrically disposed on two sides of the reactor, respectively, and each of the magnets is disposed on the inner side of the corresponding iron plate. The magnets disposed on both sides of the reactor produce magnetic fields having the same direction.

7 Claims, 2 Drawing Sheets

DEVICE AND METHOD FOR SEWAGE TREATMENT USING CONSTANT MAGNETIC FIELD

CROSS-REFERENCE TO RELATED APPLICATIONS

Pursuant to 35 U.S.C. §119 and the Paris Convention Treaty, this application claims the benefit of Chinese Patent Application No. 201210475425.9 filed Nov. 22, 2012, the contents of which are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to the field of domestic sewage treatment, and more particularly to a device and a method for sewage treatment using a constant magnetic field.

2. Description of the Related Art

Domestic sewage has good biodegradability and high contents of nitrogen and phosphorus, and biochemical methods are often used in domestic sewage treatment. Common methods for domestic sewage treatment include: oxidation ditch, sequencing batch reactor (SBR), biological contact oxidation, biological aerated filter (BAF), A/O process, and membrane bioreactor (MBR). However, as the temperature severely affects the growth, propagation, metabolism, distribution, and the size of biological populations, the efficiency of the sewage treatment plant is low in winter due to low temperature. Besides, temperature is also related to the flocculation performance of activated sludge and viscosity of the water. Thus, the sewage treatment process and parameters thereof in low temperature are significantly different from those in common temperatures.

A typical method for domestic sewage treatment in low temperature includes: a) adding a sludge collected from a bottom of an inspection hole to a biochemical incubator for aeration if the temperature is lower than 15° C.; b) adding fresh fecal effluent to form a mixture, diluting the mixture by water, slowly aerating the reactor, and replacing the water every day; c) repeating step b) so as to form a bacterial zoogloea after eight days of incubation; d) changing operation cycle of the system and the ingredients of the nutrient solution and dosages thereof, and decreasing the temperature of the sewage in the reactor; e) after ten days when the water temperature is lowered to 10° C., changing operation cycle of the system and the ingredients of the nutrient solution and dosages thereof again, and decreasing the temperature of the sewage in the reactor to realize the incubation and domestication of the bacteria populations. The method has simple and convenient operation, and materials involved therein are easily accessible. The incubation and domestication of the bacterial populations are performed in the reactor made of organic glass and plastics.

Another typical method for treatment of decentralized domestic sewage at low temperature includes: a) burying a reaction pool underground with a distance between an upper end of the reaction pool and the ground surface of 0.5 m; b) controlling an operation cycle of the reaction pool including introducing the sludge for 6 h while aerating, standing for 2 h for precipitation, decanting clarified water and discharging a resulting sludge for 2.5 h, and discharging water after stilling for 1.5 h. The invention overcomes the shortages of poor effect of the treatment on the decentralized domestic sewage of low temperature, and is suitable to treatment of decentralized domestic sewage in cold regions.

The above two methods are capable of increasing the biodegradation property of the sewage in a certain degree. However, with the improvement of the sewage treatment standard, effects of the above two methods cannot meet the standard requirements, since the biochemical reaction rate resulting from the weakened metabolism of microorganisms in low temperature cannot be completely compensated by the advantages of the processes.

A typical method for sewage treatment by using low intensity magnetic field employs SBR process. Permanent magnets are employed as a magnetic field generator. Magnetic field intensity and magnetic field type are employed as adjustable parameters (magnetic particle number is employed as the adjustable parameter when magnetic particles are added). Zeta potential, aerobic rate of the sludge, and dehydrogenase activity are employed as evaluation indicators of the stability and activity of the sludge colloid. In the presence of a certain magnetic field intensity, the COD removal rate, ammonia nitrogen removal rate, and nitrate nitrogen removal rate are increased. Particularly, when the magnetic field intensity is between 90 and 120 mT, the COD removal rate is significantly increased; when the magnetic field intensity is between 30 and 60 mT, the removal of the nitrate nitrogen is facilitated. The magnetic field has an obvious influence on the aerobic denitrification process; when the magnetic field intensity within the range of between 0 and 150 mT, the nitrate nitrogen removal rate is increased with the increase of the magnetic field intensity. However, the method is not applied in the sewage treatment in low temperature; and meanwhile, charged particles easily accumulate in one side of the magnetic field thereby affecting the mass transfer efficiency. Besides, the method doesn't realize the integration of the magnetic field and the reactor and has no magnetic shielding.

SUMMARY OF THE INVENTION

In view of the above-described problems, it is one objective of the invention to provide a device and a method for sewage treatment using a constant magnetic field that employ an intensified sewage treatment system comprising a magnetic field and microorganisms to improve the activity of the microorganisms. The magnetic field increases the mass transfer, and overcomes the drawbacks including unstable operation of the reactor during the domestic sewage treatment and low decomposition rate of the organic compounds resulting from low temperature.

To achieve the above objective, in accordance with one embodiment of the invention, there is provided a device for sewage treatment using a constant magnetic field, the device comprising: a reactor, the reactor comprising a stirrer, an aerator, an activated sludge zone, an upper end comprising a water inlet, a side wall comprising a water outlet, and a bottom comprising a sludge outlet; and a magnetic field generator, the magnetic field comprising magnets and iron plates. The activated sludge zone is disposed inside the reactor; the stirrer and the aerator are disposed within the activated sludge zone, and the aerator is arranged beneath the stirrer. The magnetic field generator is disposed outside the reactor. The magnets and the iron plates are symmetrically disposed on two sides of the reactor, respectively, and each of the magnets is disposed on an inner side of the corresponding iron plate. The magnets disposed on both sides of the reactor produce magnetic fields having the same direction.

In a class of this embodiment, the magnetic field generator further comprises an upper fixed plate and a lower fixed plate. The upper and lower fixed plates are horizontally arranged. An upper end and a lower end of each of the magnets and the iron plates are fixed on the upper fixed plate and the lower fixed plate, respectively. Positions of the magnets and the iron plates on the fixed plates are adjustable.

In a class of this embodiment, the magnets are permanent magnets.

In a class of this embodiment, the aerator employs jet aeration.

In a class of this embodiment, a magnetic field detector is arranged inside the reactor.

In accordance with another embodiment of the invention, there is provided a method for sewage treatment using the above device, the method comprising the following steps:

a) filling an activated sludge inside the reactor to form the activated sludge zone in the bottom of the reactor; mounting the magnets in parallel on two side of the reactor for allowing the magnets to form magnetic fields having the same direction in the reactor; controlling an area of each magnet to ensure the activated sludge zone to be within ranges of the magnetic fields; and mounting iron plates outside corresponding magnets;

b) inoculating the activated sludge at a temperature of between 4 and 15° C., introducing a simulated domestic sewage into the reactor, increasing an organic load from 0.03 kg/(m$^3$·d) to 0.8 kg/(m$^3$·d) at a constant gradient; jet aerating and stirring the activated sludge zone to domesticate the activated sludge in the bottom of the reactor;

c) allowing the reactor to work in the form of sequencing batch, domesticating the activated sludge for 10-15 d, reversing the direction of each of the magnets on two sides of the reactor to strengthen the activated sludge zone within the magnetic fields of the reversed direction, domesticating the activated sludge for another 10-15 d, and reversing the direction of the magnets again; and repeating the process for between 4 and 5 times until a COD removal rate is 80% and maintains a stable state; and d) after between 1 and 2 months of sludge domestication, introducing a domestic sewage after being filtered by a grid into the reactor, controlling the organic load at 0.4-1.0 kg/(m$^3$·d); reversing the direction of the magnets for every 10-15 d during the sewage treatment to form an intensified sewage treatment system comprising the magnetic field and microorganisms.

Principle of the Invention is as Follows:

In the intensified sewage treatment system comprising the magnetic field and the microorganisms, the enzyme active center comprises a plurality of transitional metal ions, such as Co, Fe, Cu, Mn, and Mo, showing paramagnetism. Under the action of the magnetic field, the molecular conformation of the enzyme was deformed and distorted, so that the enzyme active center is exposed or wrapped, whereby changing the activity of the enzyme. The osmotic pressure of water and the permeability of the bacterial membrane in the magnetic field are increased, thereby being beneficial to the nutrient absorption of microorganisms. Furthermore, the magnetic field increases the solubility of oxygen, directly facilitates the degradation of small organic molecular into nutrient elements, such as C and N, which provide nutrients for the growth of the microorganisms. The magnetic field also facilitates the movement of the charged particles in the reaction system so as to improve the mass transfer and facilitate the biochemical reaction. The invention applies a weakened magnetic field (a magnetic field intensity no exceeding 200 mT) to the microorganism in the activated sludge zone to perform biochemical reactions, magnetic biological effect, and movement of magnetic force synchronously within the reaction zone so as to intensify the degradation of organic compound by the microorganisms.

Advantages of the Invention are Summarized as Follows:

1) The device of the invention is provided with the activated sludge zone in the bottom of the reactor and the magnetic field generator outside the reactor. The activated sludge zone and the magnetic field interacts with each other to form the intensified sewage treatment system comprising the magnetic field and the microorganisms. The magnetic field affects protein active sites of enzyme in the microorganisms so as to improve the activity of the enzyme, increase the biochemical reaction rate of the microorganisms, and particularly compensate the influence of the low temperature on the enzyme activity. Besides, the magnetic field increases the velocity of charged particles thereby increasing the mass transfer efficiency, and compensates the drawbacks including unstable operation of the reactor during the domestic sewage treatment and low decomposition rate of the organic compounds resulting from low temperature so as to realize more efficient decomposition of the organic compounds in the domestic sewage and a stable operation of the reactor at low temperature.

2) The reactor of the invention operates in the form of sequencing batch; the aeration and stir are combined, thereby preventing dead angle from being formed in the reactor. The aeration employs jet aeration so as to effectively prevent aeration holes from blockage, improve the sludge load and organic load in the reactor, shorten the retention time of the sewage, and lower the production cost.

3) The intensified sewage treatment system comprising the magnetic field and microorganisms employs permanent magnets to form the magnetic field, the magnetic field energy of which is sufficiently used, so that the power energy is lowered and the environment pollution is reduced.

BRIEF DESCRIPTION OF THE DRAWINGS

The invention is described hereinbelow with reference to the accompanying drawings, in which.

Figure 1:
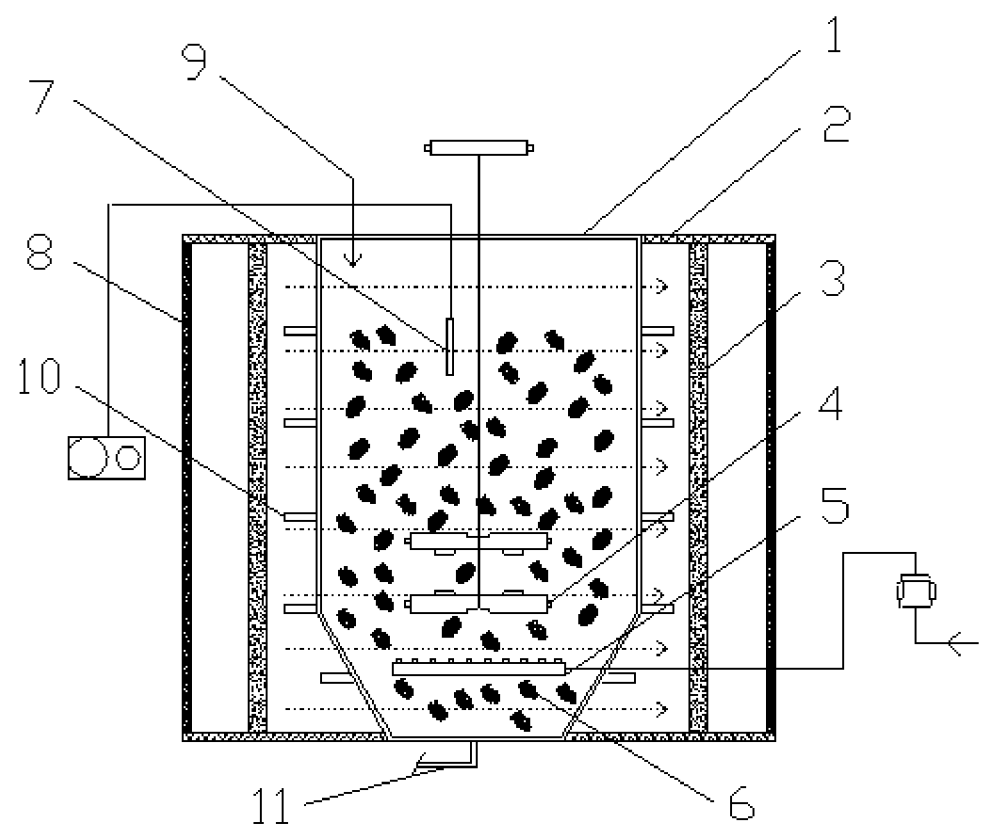
FIG. 1 is a structure diagram of a device for sewage treatment using a constant magnetic field in accordance with one embodiment of the invention.

In the drawings, the following reference numbers are used: 1. Reactor; 2. Fixed plate; 3. Magnet; 4. Stirrer; 5. Aerator; 6. Activated sludge zone; 7. Magnetic field detector; 8. Iron plate; 9. Water inlet; 10. Water outlet; and 11. Sludge outlet.

DETAILED DESCRIPTION OF THE EMBODIMENTS

For further illustrating the invention, experiments detailing a device and a method for sewage treatment using a constant magnetic field are described below. It should be noted that the following examples are intended to describe and not to limit the invention.

Example 1

Figure 2:
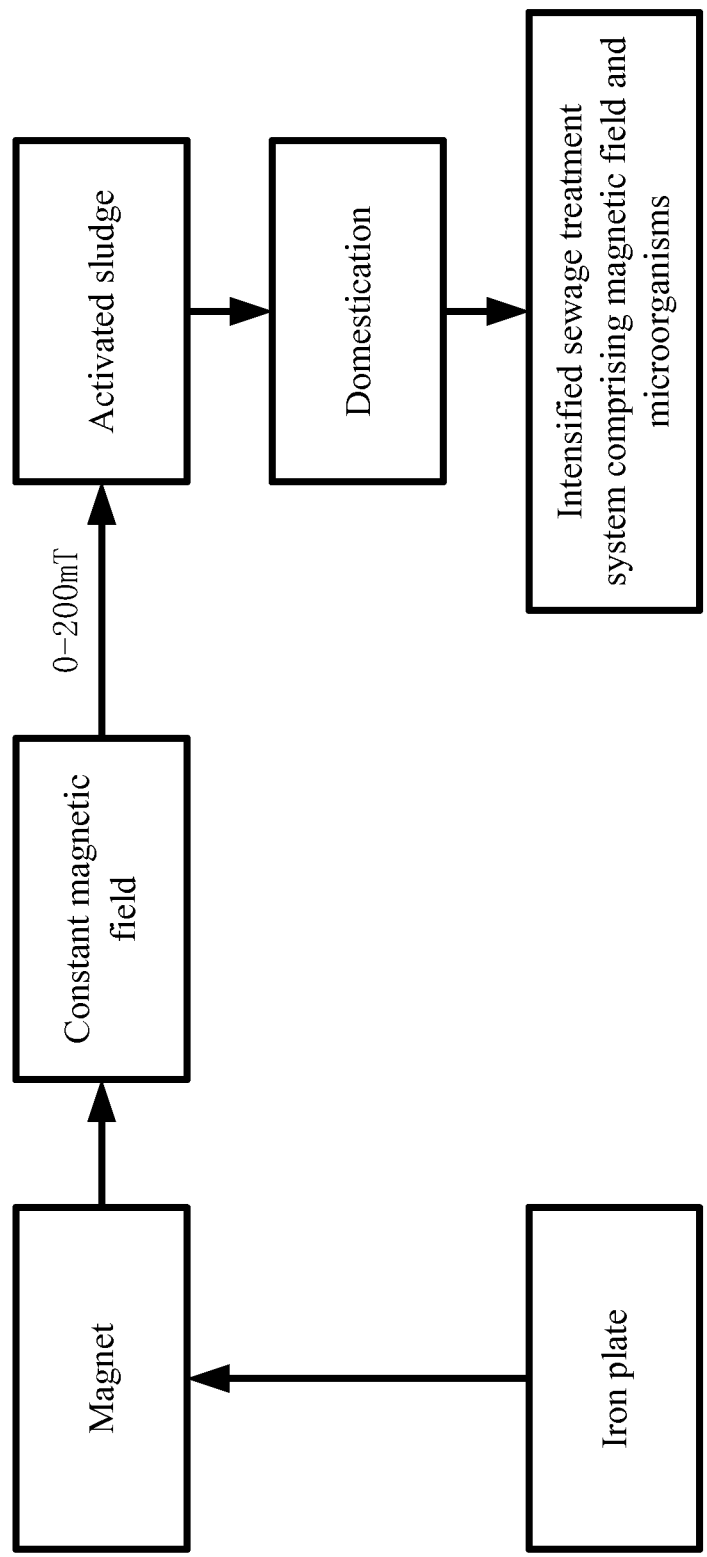
FIG. 2 is a process flow diagram of a method for sewage treatment using a constant magnetic field in accordance with one embodiment of the invention.

As shown in FIGS. 1-2, a sewage treatment plant employed a domestic sewage treatment process comprising the following steps:

a) A reactor 1 having a ratio of height:length:width=2:1:1 was provided. The reactor comprised an activated sludge zone 6, a stirrer 4, an aerator 5, an upper end comprising a water inlet 9, a side wall comprising a water outlet 10, and a bottom comprising a sludge outlet 11. The activated sludge was inoculated at the temperature of 4° C. The activated sludge zone 6 was disposed inside the reactor 1. The stirrer 4 and the aerator 5 were arranged inside the activated sludge zone 6, and the aerator 5 was arranged beneath the stirrer 4. Two ferrite magnets 3 were arranged in parallel on two sides of the reactor 1, an area of each of the ferrite magnets 3 was adjusted to allow the activated sludge zone 6 to be within a range of the magnetic field. Two iron plates 8 having a thickness of 25 mm were arranged outside the ferrite magnets 3, respectively, for weakening the magnetic field from diffusing to the periphery. A magnetic field was employed to measure the magnetic field intensity. An upper end and a lower end of the ferrite magnets 3 and the iron plates 8 were fixed on an upper fixed plate 2 and a lower fixed plate 2, respectively. Positions of the ferrite magnets 3 and the iron plates 8 on the fixed plates were adjustable. A distance between the two ferrite magnets 3 was adjusted to allow the magnetic field intensity in a center of the activated sludge zone 6 to be 20 mT.

b) A simulated domestic sewage was introduced into the reactor 1. A concentration of the simulated domestic sewage was gradually increased so as to increase an organic load from 0.03 kg/(m$^3$·d) to 0.4 kg/(m$^3$·d) at a constant gradient. Thereafter, the activated sludge zone 6 was jet aerated and stirred, an aeration rate was controlled at 2.5 kg O$_2$/kg BOD for each unit of sewage; and low temperature and magnetic field domestication were performed synchronously in the reactor 1.

c) The reactor was allowed to work in the form of sequencing batch, a hydraulic retention time (HRT) was controlled at 8 h. The activated sludge was retained and domesticated for 10 d, then the direction of each of the magnets 3 was reversed so as to strengthen the activated sludge zone 6 within the magnetic fields of the reversed direction. After the activated sludge was retained and domesticated for another 10 d, the direction of the magnets 3 was reversed again. The process was repeated for four times until a COD removal rate was 81%, thereby achieving a stable state and finishing the domestication process; and d) After the sludge domestication, a domestic sewage after being filtered by a grid was introduced into the reactor 1. The organic load was controlled at 0.4 kg/(m$^3$·d); and the aeration rate was controlled at 1.5 kg O$_2$/kg BOD for each unit of sewage. The direction of the magnets 3 was reversed for every 10 d during the sewage treatment to form an intensified sewage treatment system comprising the magnetic field and microorganisms.

The reactor 1 operated well at the low temperature during the above processes, and was able to save approximately 500-600 RMB/year, a COD removal rate was increased by 25-30%, and an ammonia nitrogen removal rate was increased by 10-15%.

Example 2

As shown in FIGS. 1-2, a sewage treatment plant employed a sewage treatment process comprising the following steps:

a) A reactor 1 having a ratio of height:length:width=4:2:1 was provided. A bottom of the reactor 1 was in a shape of a rectangular. The reactor comprised an activated sludge zone 6, a stirrer 4, an aerator 5, an upper end comprising a water inlet 9, a side wall comprising a water outlet 10, and a bottom comprising a sludge outlet 11. The activated sludge zone 6 was disposed inside the reactor. The stirrer 4 and the aerator 5 were arranged inside the activated sludge zone 6, and the aerator 5 was arranged beneath the stirrer 4. Two ferrite magnets 3 were arranged in parallel on two sides of the reactor 1, an area of each of the ferrite magnets 3 was adjusted to allow the activated sludge zone 6 be within a range of the magnetic field. Two iron plates 8 having a thickness of 50 mm were arranged outside the ferrite magnets 3, respectively, for weakening the magnetic field from diffusing to the periphery. A magnetic field was employed to measure the magnetic field intensity. A distance between the two ferrite magnets 3 was adjusted to allow the magnetic field intensity in a center of the activated sludge zone 6 to be 200 mT. The activated sludge was inoculated at the temperature of 15° C., and the activated sludge zone was formed at the bottom of the reactor 1.

b) A simulated sewage was introduced into the reactor 1. A concentration of the simulated sewage was gradually increased so as to increase an organic load from 0.03 kg/(m$^3$·d) to 0.8 kg/(m$^3$·d) at a constant gradient. Thereafter, the activated sludge zone 6 was jet aerated and stirred, an aeration rate was controlled at 3.0 kg O$_2$/kg BOD for each unit of sewage; and low temperature and magnetic field domestication were performed synchronously in the reactor 1.

c) The reactor was allowed to work in the form of sequencing batch, HRT was controlled at 10 h. The activated sludge was retained and domesticated for 15 d, then the direction of each of the magnets 3 was reversed so as to strengthen the activated sludge zone 6 within the magnetic fields of the reversed direction. After the activated sludge was retained and domesticated for another 15 d, the direction of the magnets 3 was reversed again. The process was repeated for five times until a COD removal rate was 91%, thereby achieving a stable state and finishing the domestication process; and d) After the sludge domestication, a domestic sewage after being filtered by a grid was introduced into the reactor 1. The organic load was controlled at 1.0 kg/(m$^3$·d); and the aeration rate was controlled at 2.0 kg O$_2$/kg BOD for each unit of sewage. The direction of the magnets 3 was reversed for every 15 d during the sewage treatment to form an intensified sewage treatment system comprising the magnetic field and microorganisms.

The reactor 1 operated well at the low temperature during the above processes, and was able to save approximately 900-1200 RMB/year, a COD removal rate was increased by 30-35%, and an ammonia nitrogen removal rate was increased by 15-20%.

Example 3

The structure of the device for sewage treatment of Example 3 was the same as that in Example 1, except that the magnetic field intensity of the center of the reactor was controlled at 100 mT. The process for sewage treatment comprised the following steps:

a) At a temperature of 10° C., an activated sludge was filled inside the reactor 1 to form the activated sludge zone 6 in the bottom of the reactor 1. Two magnets 3 was mounted in parallel on two side of the reactor 1 for allowing the magnets 3 to form magnetic fields having the same direction in the reactor 1. An area of each magnet 3 was adjusted to allow the activated sludge zone to be within ranges of the magnetic fields; and iron plates were mounted outside corresponding magnets 3.

b) A simulated sewage was introduced into the reactor 1. A concentration of the simulated sewage was gradually increased so as to increase an organic load from 0.03 kg/(m$^3$·d) to 0.5 kg/(m$^3$·d) at a constant gradient. Thereafter, the activated sludge zone 6 was jet aerated and stirred, an aeration rate was controlled at 2.7 kg $O_2$/kg BOD for each unit of sewage; and low temperature and magnetic field domestication were performed synchronously in the reactor 1.

c) The reactor was allowed to work in the form of sequencing batch, HRT was controlled at 9 h. The activated sludge was retained and domesticated for 12 d, then the direction of each of the magnets 3 was reversed so as to strengthen the activated sludge zone 6 within the magnetic fields of the reversed direction. After the activated sludge was retained and domesticated for another 12 d, the direction of the magnets 3 was reversed again. The process was repeated for four times until a COD removal rate was 85%, thereby achieving a stable state and finishing the domestication process; and d) After the sludge domestication, a domestic sewage after being filtered by a grid was introduced into the reactor 1. The organic load was controlled at 0.8 kg/($m^3$·d); and the aeration rate was controlled at 2.0 kg $O_2$/kg BOD for each unit of sewage. The direction of the magnets 3 was reversed for every 12 d during the sewage treatment to form an intensified sewage treatment system comprising the magnetic field and microorganisms.

The reactor 1 operated well at the low temperature during the above processes, and was able to save approximately 900-1200 RMB/year, a COD removal rate was increased by 28-30%, and an ammonia nitrogen removal rate was increased by 17-19%.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A device for sewage treatment, comprising:
   a) a reactor, the reactor comprising a stirrer, an aerator, an activated sludge zone, an upper end comprising a water inlet, a side wall comprising a water outlet, a bottom comprising a sludge outlet; and
   b) a magnetic field generator, the magnetic field generator comprising two magnets and two iron plates;
   wherein:
   the activated sludge zone is disposed inside the reactor; the stirrer and the aerator are disposed within the activated sludge zone, and the aerator is arranged beneath the stirrer;
   the magnetic field generator is disposed outside the reactor;
   the two magnets are symmetrically disposed on two opposite sides of the reactor, the two iron plates are symmetrically disposed on the two opposite sides of the reactor, and each of the two magnets is disposed on an inner side of one of the two iron plates; and
   the two magnets disposed on the two opposite sides of the reactor produce magnetic fields having the same direction.

2. The device of claim 1, wherein
   the magnetic field generator further comprises an upper fixed plate and a lower fixed plate;
   the upper and lower fixed plates are horizontally arranged with respect to the ground;
   an upper end and a lower end of each of the two magnets and the two iron plates are removably disposed on the upper fixed plate and the lower fixed plate, respectively; and
   positions of the two magnets and the two iron plates are adjustable.

3. The device of claim 2, wherein the two magnets are permanent magnets.

4. The device of claim 3, wherein the aerator employs jet aeration.

5. The device of claim 1, wherein a magnetic field detector is arranged inside the reactor.

6. The device of claim 4, wherein a magnetic field detector is arranged inside the reactor.

7. A method for sewage treatment using the device of claim 1, the method comprising the following steps:
   a) filling the reactor with activated sludge to form the activated sludge zone in the bottom of the reactor; b) respectively mounting the two magnets in parallel on two opposite sides of the reactor for allowing the two magnets to form magnetic fields having the same direction in the reactor, wherein each magnet is sized to ensure the activated sludge zone to be within ranges of the magnetic fields; and respectively mounting the two iron plates outside the two magnets;
   c) inoculating the activated sludge at a temperature of between 4 and 15° C., introducing a simulated domestic sewage into the reactor, increasing an organic load from 0.03 kg/($m^3$·d) to 0.8 kg/($m^3$·d) COD at a constant gradient; jet aerating and stirring the activated sludge zone;
   d) allowing the reactor to work in the form of sequencing batch, domesticating the activated sludge for 10-15 d, reversing the direction of each of the two magnets on two sides of the reactor, domesticating the activated sludge for another 10-15 d, and reversing the direction of the two magnets again; and repeating the domestication for between 4 and 5 times until a COD removal rate is 80% and maintains a stable state; and
   e) after between 1 and 2 months of sludge domestication, introducing a domestic sewage after being filtered by a grid into the reactor, controlling the organic load at 0.4-1.0 kg/($m^3$·d) COD; reversing the direction of the two magnets for every 10-15 d during the sewage treatment to form an intensified sewage treatment system comprising the magnetic field and microorganisms.

* * * * *